May 8, 1956　　　H. WILMS　　　2,744,720
ROTARY VALVE

Filed April 2, 1953　　　　　　　4 Sheets-Sheet 2

Hermann Wilms,
Inventor
Koenig and Pope
Attorneys.

May 8, 1956  H. WILMS  2,744,720
ROTARY VALVE
Filed April 2, 1953  4 Sheets-Sheet 3

Hermann Wilms,
Inventor.
Koenig and Pope,
Attorneys.

May 8, 1956     H. WILMS     2,744,720
ROTARY VALVE
Filed April 2, 1953     4 Sheets-Sheet 4

Hermann Wilms,
Inventor.
Koenig and Pope,
Attorneys.

United States Patent Office 2,744,720
Patented May 8, 1956

2,744,720

ROTARY VALVE

Hermann Wilms, University City, Mo.

Application April 2, 1953, Serial No. 346,321

12 Claims. (Cl. 251—161)

This invention relates to valves, and with regard to certain more specific features, to plug valves for controlling flow of fluids, including gases and liquids.

Among the several objects of the invention may be noted the provision of a plug valve which may be freely operated although the fit between its sealing member and body when the valve is closed is highly accurately circular and without clearance; the provision of a plug valve of the class described which may be positively closed without sticking, yet which requires no lubricant; and the provision of a valve of this type which is completely and positively sealed against leakage but employs none of the usual soft packings between the valve body and rotary control stem. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is an axial section through one form of the valve shown in open position;

Corresponding reference characters indicate corresponding parts throughout the several views of the drawings.

Briefly, the invention comprises a valve body having a fluid passage intersected by a rotary cut-off wedge or cone and sleeve or plug forming a rotary plug assembly. The wedge member or cone, and sleeve or plug, of the assembly are rotary as a unit but the cone is movable axially with respect to the sleeve. Rotation of the assembly is controlled by an outside first control member on the valve. The axial movement of the cone relative to the sleeve is controlled from an outside second control member on the valve. Operation of the first control member functions to prevent rotation of the cone-sleeve assembly when it is desired axially to move the cone by the second control member. Rotation of the first control member also controls flow through the valve by controlling the position of the cone-sleeve assembly.

The second control member serves to tighten or relieve the seating forces on the sleeve. A reactive arrangement is provided tightly seal the valve against leakage when the seating forces come into play upon the sleeve or plug. Improved packless means are employed for preventing leakage from the valve body when the seating forces on the sleeve are relieved.

Figure 1:
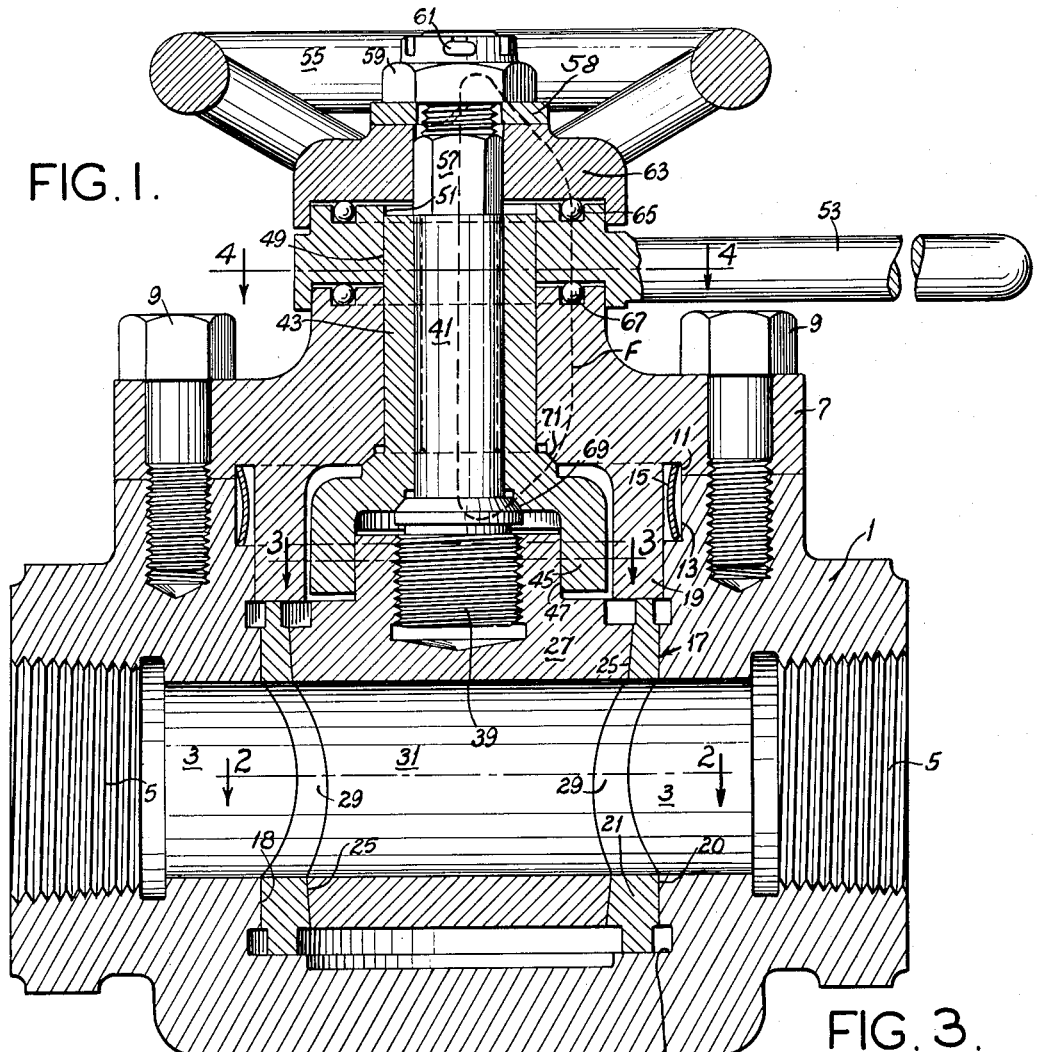
Figure 2:
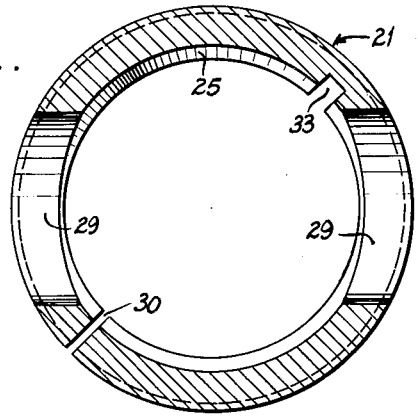
Fig. 2 is a horizontal section of a seating sleeve as viewed on line 2—2 of Fig. 1 but removed from the valve body.
Figure 3:
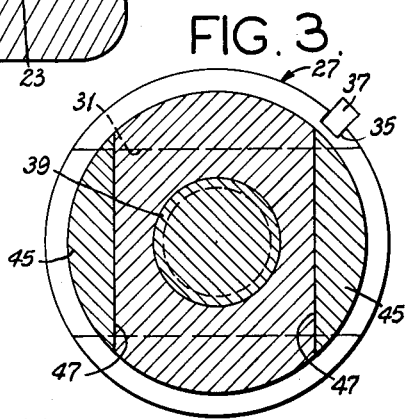
Fig. 3 is a fragmentary cross section taken on line 3—3 of Fig. 1 and showing an operating cone removed from the valve body.

Referring now more particularly to Fig. 1, there is shown at numeral 1 a hollow valve body having ports 3 forming a through passage. The ends of the ports are provided with threaded attachment means 5. Obviously, other means may be employed for effecting attachments, such as bolted flanges, welding or the like. At numeral 7 is shown a valve bonnet attached to the body by fasteners 9. The bonnet 7 may be fastened to the body 1 by means other than the bolts 9, and from one viewpoint it may be considered to be part of the valve body as a whole.

Figure 9:
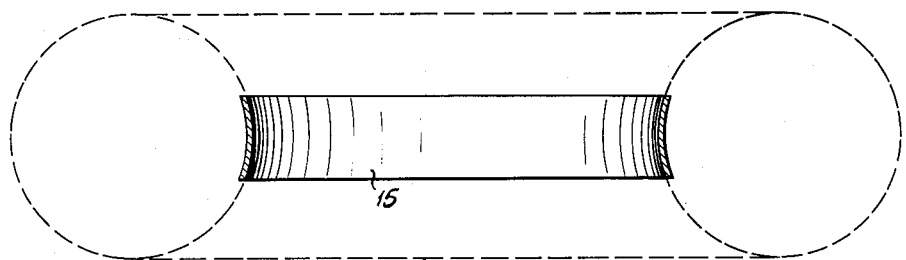

Circular pockets or counterbores 11 and 13 are provided in the body 1 and the bonnet 7 for accepting a nonsplit, flexible spring steel bonnet ring 15 of approximately semitoroidal shape. The normal distance between the edges of ring 15 is greater than the distance between the ends of the pockets 11 and 13 when in assembled positions. The part of the imaginary toroid formed by the ring is its inside. This is illustrated by way of example (not limitation) in Fig. 9, wherein numeral 16 indicates the formative toroid. The shape of the ring 15 may broadly be classified as of hourglass form. Thus when the bonnet 7 is bolted down on the body 1, the ring is axially compressed and sprung, its ends forming seals. Any increased pressure inside the ring 15 (tending toward leakage) tends to flatten its arc and increases its endwise sealing effect. Therefore, the greater the pressure tending to cause leakage at this point, the better is the seal.

Figure 6:
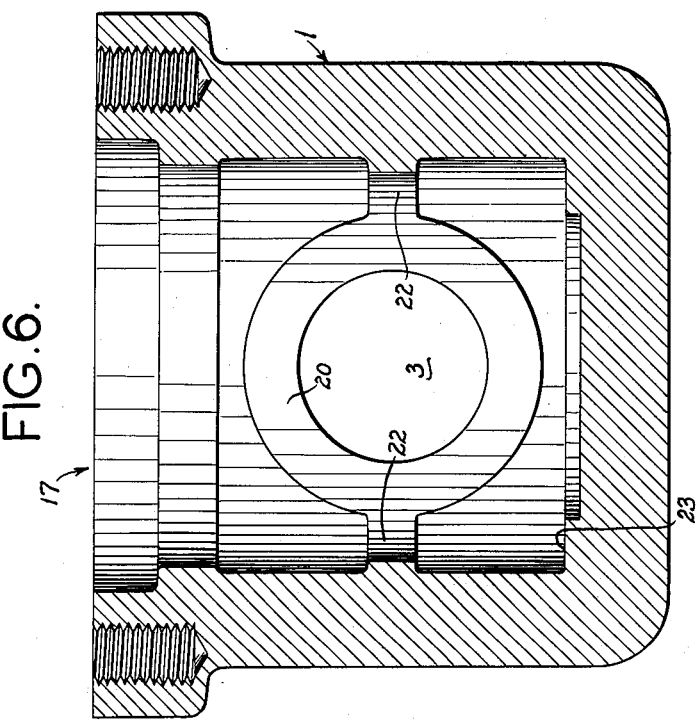
Fig. 6 is a vertical section taken on line 6—6 of Fig. 5.
Figure 5:
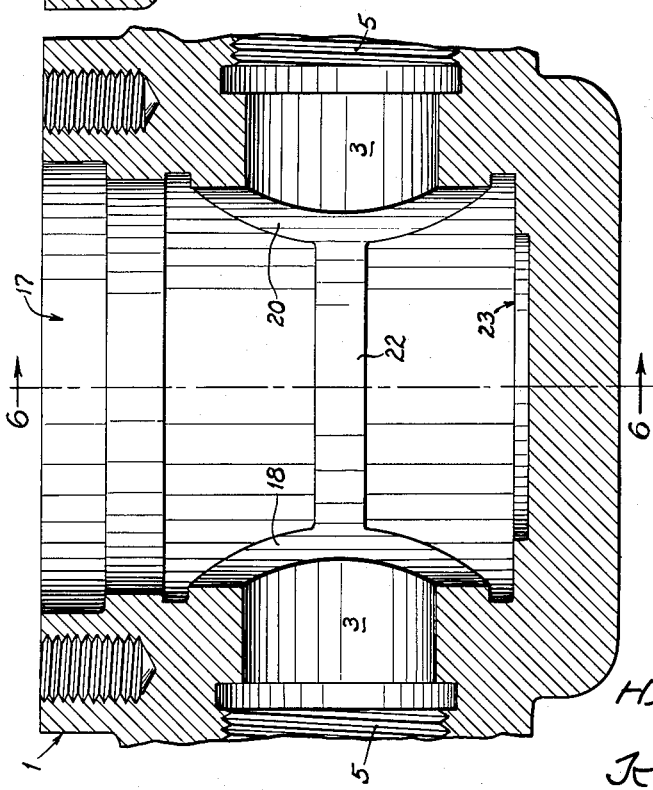
Fig. 5 is an axial section similar to Fig. 1 but showing only the valve body.

The body 1 contains a preferably cylindric, stepped cross bore 17, into the upper end of which extends a fixed sleeve 19. The latter extends from the bonnet 7. Within the cylindric bore 17 is a rotary sleeve or hollow plug 21 having running endwise clearances with respect to the end of the sleeve 19 and the bottom 23 of the bore 17. While, as stated, it is preferred that the outside form of the sleeve 21 be cylindric, it may be of other suitable shape, such as tapered. It will be noted from Figs. 5 and 6 that the part of the cylindric bore 17 with which the sleeve 21 engages is in the nature of two circular lands 18 and 20, surrounding the ends of passages 3 in the body 1, and circular land portions 22 joining the lands 18 and 20. In other words, the bore 17 is relieved from engagement with the sleeve 21 at all points except on the lands 18, 20 and 22.

The inside surface of the sleeve 21 is conical, as indicated at 25, which forms a seat for a conical seating cone or wedge-shaped seating member 27. The sleeve 21 contains openings 29 in alignment with an opening 31 through the cone 27. This alignment is maintained by keyways 33 and 35 in the sleeve 21 and cone 27, respectively, a key 37 being fastened in the keyway 35 and extending into the keyway 33. The key 37 is effective to maintain a rotary connection between the cone 27 and sleeve 21, but permits axial movement of the cone with respect to the sleeve. The sleeve is axially split, as shown at 30. The method of splitting will be developed below.

It will also be understood that while the shape of the inside of the sleeve 21 and the outside of the member 27 is shown as being formed by straight-line generating elements, other conical or tapered shapes may be used, and for brevity they are all referred to herein as being conical, or cones.

Freely threaded to the upper end of the cone 27, as indicated at 39, is the lower end of a seating stem 41 which passes through a turning sleeve 43, the latter being rotary in the bonnet 7. Although a threaded connection 39 is shown, it will be understood that other equivalent connections may be used for the purpose of moving the cone axially upon rotation of the stem 41. These will hereinafter be referred to in general as helical connections, which comprehend threads, pin-and-slot combinations, axial cams, et cetera.

Figure 4:
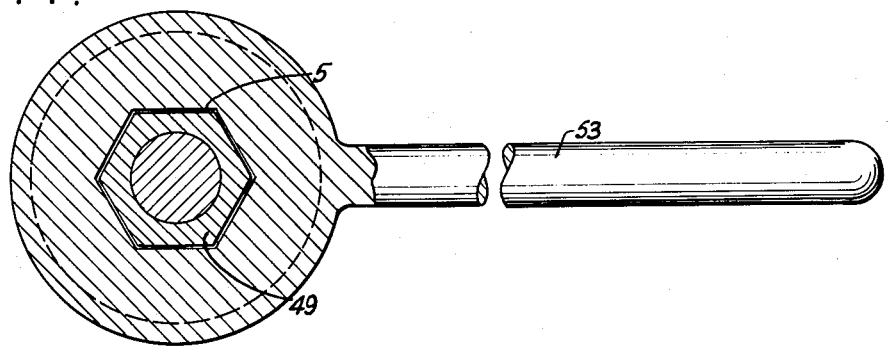
Fig. 4 is a cross section taken on line 4—4 of Fig. 1 and showing a turning handle.

The lower end of the sleeve 43 is forked, as indicated at 45, to engage opposite flats 47 at the upper end of the cone 27. The upper end of the sleeve 43 is hexagonal, as indicated at 49 in Fig. 4, for the reception of hexagonal opening 51 of a turning handle or first control member 53. Obviously, then, the handle 53, turning sleeve 43, cone 27 and seating sleeve 21 may be turned as a unit from an "on" position shown in Fig. 1 (passages 3, 29 and 31 in alignment) to an "off" position (passages 29 and 31 angled out of alignment with passages 3).

The upper end of the seating stem 41 has affixed thereto a handwheel or second control member 55. The arrangement comprises a hexagonal connection 57 with the hub 63 of the handwheel 55 and includes a threaded nut 59 which may be drawn down and held in any given position by a key 61. An antifriction ball bearing seat 65 is provided between the members 63 and 53 and another such seat 67 is provided between member 53 and the bonnet 7.

From the above, it will be seen that by turning the handwheel 55, the seating stem 41 may be turned relatively to the turning sleeve 43, cone 27 and sleeve 21. Therefore, if the handle 53 is held and the wheel 55 turned, the cone 27 may be moved axially up and down through the action of the threaded connection 39 between the stem 41 and the cone 27.

To prevent leakage, a ground conical seat 69 is provided between the stem 41 and sleeve 43; also a ground conical seat 71 is provided between the turning sleeve 43 and the bonnet 7. The nut 59 is so adjusted against a spring washer 58 that these seats are kept in sealed rubbing engagement without undue binding. The closed reactive force loop to maintain proper seating at 65, 67, 69 and 71, but allowing fairly free relative rotation between members 41, 43 and 7, is indicated by a dotted line indexed F. It will also be noted that any pressure tending towards leakage pushes up the stem 41 and serves to apply additional seating load on the seats 69 and 71. Thus an effective seal against leakage is provided which, as in the case of ring 15, improves with increase of pressure within the valve.

Operation is as follows:

In full open position of the valve, the handle 53 is parallel to the axis of passages 3 and the handwheel 55 has been turned anticlockwise (looking down on the wheel 55) so as to force the seating cone 27 into the conical seat 25 within the sleeve 21. This expands the split sleeve 21 so that its exterior portion seats on the lands 18, 20 and 22 of bore 17. To close the valve, the handwheel 55 is first turned clockwise (looking down) which, through the connection 39, retracts the seating cone 27, the limit of retraction being determined by contact between the top of the cone 27 with the bottoms of forks 45. This relieves the expansive pressure on the split sleeve 21. During this retracting operation the sleeve 21 cannot rotate because of its keyed connection with the cone 27, and the cone 27 is prevented from rotating by holding the handle 53. Note in this connection the forked connection at 45, 47 between the control sleeve 43 and the cone 27, the sleeve 43 being under control of handle 53. By making the threads at 139, or equivalent left-handed, instead of right-handed as shown, the wheel 155 would be turned clockwise to seat the sleeve and anticlockwise to unseat it.

After the cone 27 has been retracted, the handle 53 is turned crosswise of the axis of passages 3. This turns the sleeve 43, cone 27 and sleeve 21. At this time cone 27 and sleeve 21 are loose, relative to one another, and the sleeve turns freely in the body 1. Finally the wheel 55 is turned anticlockwise, which again forces the cone 27 into the sleeve 21, thus expansively reseating the latter on the lands 18, 20 and 22. To reopen the valve, the stated series of operations is reversed. Obviously, the valve may, through the operations described, be set in any partially open or closed position. When the cone 27 is pushed down the reaction on stem 41 strongly loads the seats 69 and 71 to assure safety against leakage.

The split 30 in the sleeve 21 can be made in such manner as to permit the sleeve to be normally in expanded or contracted position when the cone 27 is retracted. Thus if during the circular machining of the sleeve 21 the sides of the split 30 are forced together while finishing machining, the sleeve will tend to expand when released. This method is employed when it is desired to have the sleeve 21 at all times springingly engage the lands 18, 20 and 22 in the body 1. This prevents foreign particles from entering upon the engaging surfaces. And these surfaces are then always substantially circular while springingly engaged, though not wedgingly engaged when the valve is being operated.

On the other hand, if there is not much danger from action of foreign particles, as when a gas line is controlled, then the sleeve 21 is made normally to contract away from the lands 18, 20 and 22. To provide this contracting feature, the slot 30 is opened a predetermined distance by inserting a filler piece, and after circular machining this filler piece is removed, which allows the sleeve to contract to its normal position. In this case the retracting operation of the seating cone 27 will be followed by contraction of the sleeve 21 to provide clearance between the outside of the sleeve and the land seats 18, 20 and 22. This has the advantage of increasing the life of the seating surfaces, since there will be no rubbing action during valve operation. In either case, however, the sleeve is tightly and immovably seated when wedged by the cone 27. Also, in either case, the shape of the sleeve 21 is precisely circular when pressed into seating engagement by cone 31. But in view of its springiness, it may be circularly machined in either of the two cases above described with a circular clearance relative to the cylindric opening for which it is intended, which is far less than would otherwise be possible. As a result, the fit between sleeve 21 and body 1, when in pressure-sealing engagement, is highly accurate throughout a complete circle. Nevertheless, when relieved of pressure-sealing engagement, its freedom of rotary movement can be made greater than would be the case with a solid sleeve originally machined with the same small clearance and used in a nonsplit form. And of course if it were machined circular with the split 30 in it but while unsprung, the stated advantages of the two forms described would not accrue, except with an alternative structure such as described below.

Figure 7:
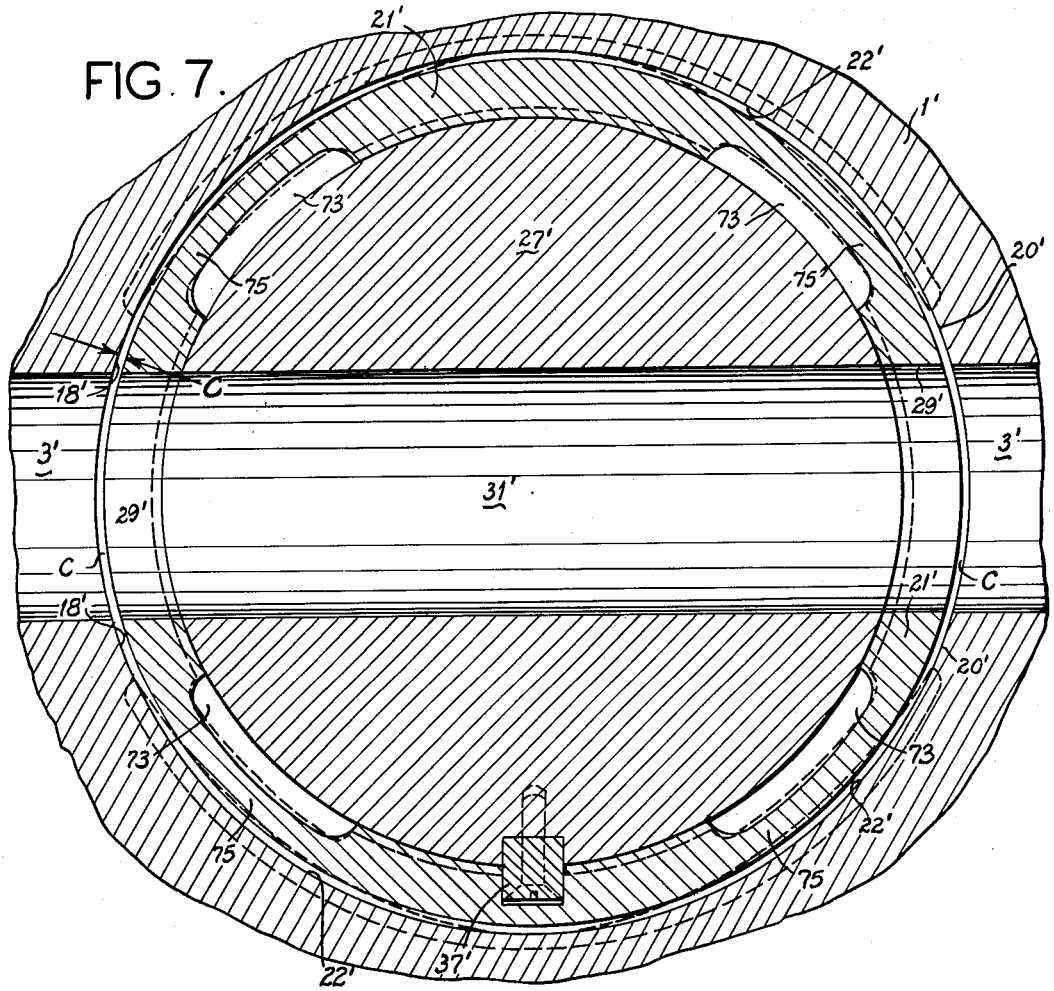
Fig. 7 is an enlarged horizontal section similar to that shown in Fig. 2 but showing an alternative form of seating sleeve, some adjacent parts being also shown.

In Fig. 7 is shown an alternative form of body, sleeve and cone arrangement, in which the primed numbers indicate parts corresponding in general with the form and function to those parts already described as having the same but unprimed numbers. These require no further description.

The sleeve 21' in this case is not split in order to gain resiliency but is annularly solid, being provided with relief portions 73 forming relatively thin springy bridges 75. When the cone 27' is retracted from the sleeve 21', the sleeve has a substantially circular normal form, as shown by the solid lines. In this form it has a slight clearance with respect to the lands 18', 20' and 22', as indicated exaggeratedly by letter C. When the cone 27' is advanced into the sleeve 21', the sleeve distorts from a circular form to one in which the bridges 75 straighten, so that local enlargements are obtained along right-angular axes, as shown by the dotted lines in Fig. 7. The result is a seating of the sleeve on the lands 18' and 20'. There is also a seating at the central portions of the lands 22', but this is incidental when the valve is open, as shown in Fig. 7. To close this form of the valve, the cone 27' is again retracted. Then the assembly of the cone 27' and sleeve 21' is turned through 90°. The cone 27' is then advanced into the sleeve, which causes seating of nonported portions of the sleeve on the lands 18' and 20'.

Figure 8:
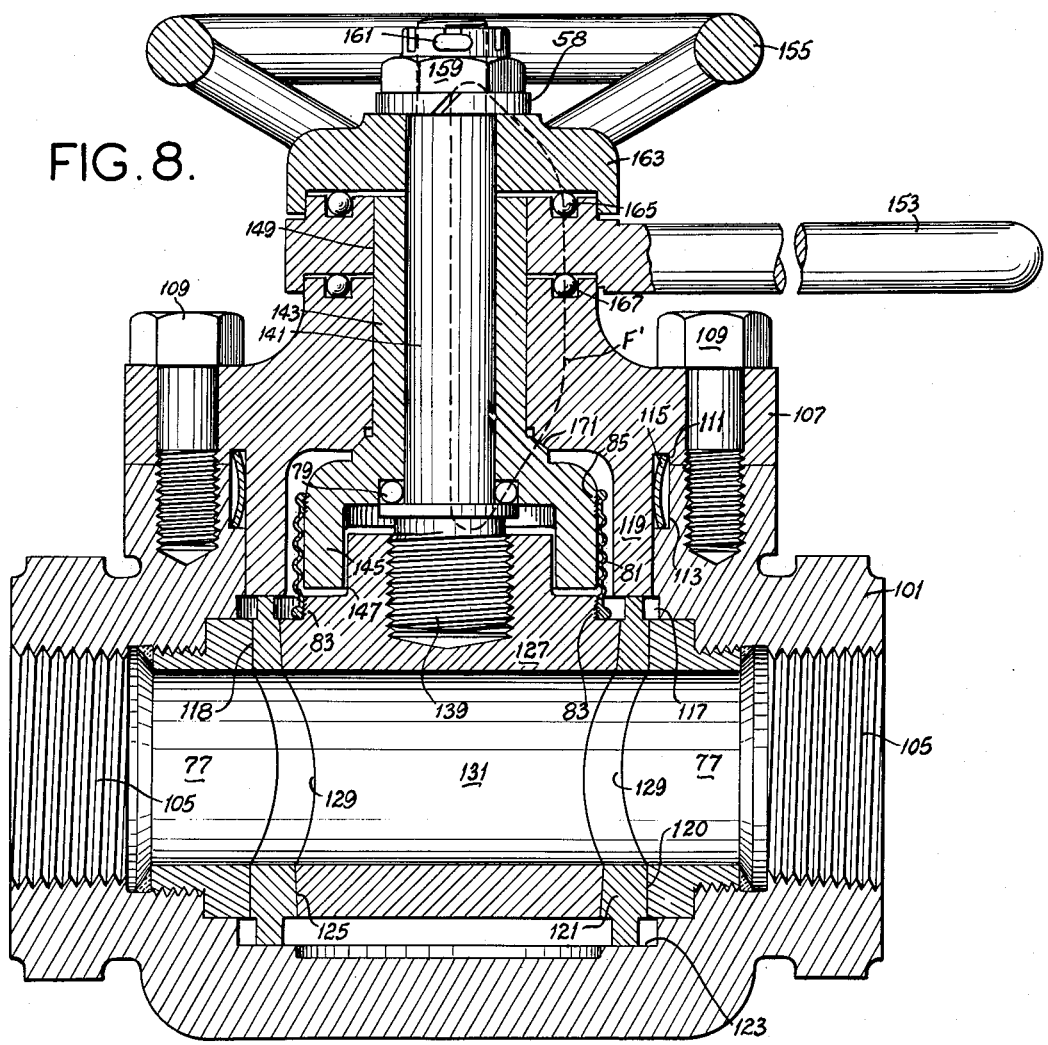
Fig. 8 is a view similar to Fig. 1 but showing an alternative form of the invention; and, Fig. 9 is a cross section of a flexible sealing ring, showing in dotted lines a formative toroidal figure.

In Fig. 8 is shown another form of the valve which employs a seating cone and sleeve similar to those shown in Fig. 1, and most of the other parts are similar. To indicate these similar parts, reference numerals have been used which are the same as those shown in Fig. 1 but each increased by 100 units. It will be unnecessary again to describe these similar parts, but only the differences.

One of the differences consists in the insection of removable and replaceable seat rings 77, upon which are the lands 118 and 120. In this case the lands 22 shown in Figs. 5 and 6 may be omitted.

Another difference is in the elimination of the conical seat 69 (Fig. 1) and the substitution therefor of an antifriction ball seat at 79 (Fig. 8). This reduces the turning friction between parts assembled with the handle 153 and those assembled with the handwheel 155. However, a ball seat such as this is not leakproof. Therefore, to prevent leakage between stem 141 and sleeve 143, a flexible metal bellows sleeve connection 81 is provided. This is welded or otherwise hermetically sealed to a circular shoulder 83 of the cone 127 and to the circular portion of the sleeve 143 just above its fork portions 145 (see the attachments 83 and 85). An advantage of this form of the invention is that rotation can be effected between the handwheel 155 and the turning handle 153 with less friction, even with more stress in the force loop F'. This is because of the free running ball seats 79 and 165. Thus in this form of the invention the wheel 155 is easier to operate. A detailed description of its operation will not be necessary, since it is obvious from the description already given in connection with the form of the invention shown in Figs. 1–6.

While the sealing member 81 is shown as being of the bellows sleeve type, it will be understood that this may be any flexible diaphragm type of seal, and may hereinafter be so referred to.

It will be seen that in all forms of the invention the sleeve 21 is required to have resilience, so that it may be expanded into tight wedging engagement with the lands in body 1 or to be relieved against such tight engagement. To this end it may of the metallic forms already described, or composed of other suitable resilient materials such as synthetic rubber, silicones, plastic or the like.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A valve comprising a body having a fluid transmitting passage, a cross passage including an annular seat, a radially resilient hollow plug in the cross passage adapted to effect radial sealing engagement with the body to control the fluid transmitting passage, said plug having a hollow wedge-shaped interior flaring in the direction of said seat, a wedge engaging the wedge-shaped interior of the plug and adapted upon movement into the plug away from said seat to expand the plug into radial sealing engagement with said body, a connection between the wedge and the plug providing for their relative axial movements but substantially coextensive rotary movements as a rotary assembly, said rotary assembly having fluid transmitting passages for registry and nonregistry with the fluid transmitting passage of the body, a first control member adapted to be rotated from outside of the body and having means passing into the body through said annular seat and including a circular portion engageable for sealing with said seat and also having a driving connection with said rotary assembly for coextensive rotary movements therewith, but allowing for relative axial movements, and a second control member adapted to be rotated from outside of the body and having a screw connection with the wedge, said second control member including a portion reactive against said first control member when the wedge is axially moved into the plug by action of said screw connection, whereby said circular portion of the first control member is reactively forced into engagement with said annular seat when the wedge is driven into the plug to force the plug into radial sealing engagement with said body.

2. A valve made according to claim 1, wherein said first control member is in the form of a sleeve and said second control member is in the form of a stem passing through the sleeve, said stem having a shoulder forming said portion reactive against the first control member.

3. A valve made according to claim 2, wherein said annular seat on the body and circular portion on the first control member are constituted by beveled seating surfaces and wherein said first control member and the portion reactive against it are also formed as cooperating beveled seating surfaces.

4. A valve made according to claim 2, wherein said annular seat and circular portion on the first control member are constituted by beveled surfaces and wherein said first control member and the portion on the second control member reactive against it are formed as an antifriction bearing, and including a bellows-type flexible sealing means between the first control member and the wedge.

5. A valve comprising a body having a fluid transmitting passage, a cross passage including an annular seat, a radially resilient hollow plug in the cross passage adapted to effect radial sealing engagement with the body to control the fluid transmitting passage, said plug having a hollow wedge-shaped interior flaring in the direction of said seat, a wedge engaging the wedge-shaped interior of the plug and adapted upon movement into the plug away from said seat to expand the plug into radial sealing engagement with said body, a connection between the wedge and the plug providing for their relative axial movements but substantially coextensive rotary movements as a rotary assembly, said rotary assembly having fluid transmitting passages for registry and nonregistry with the fluid transmitting passage of the body, a first control member constituted by an outside manual control rotary on the body and a sleeve passing into the body through the annular seat and including a circular shoulder portion engageable with said seat, said sleeve also having driving connections with said manual control and with said rotary assembly for coextensive rotary movements therewith but allowing for relative axial movements, and a second control comprising a second outside manual control and a rigidly attached stem passing into the valve through said sleeve and having a screw connection with the wedge, said second control member including a portion reactive against said sleeve when the wedge is axially moving into the plug by action of said screw connection, whereby said circular shoulder portion of the sleeve is reactively forced into pressure engagement with said annular seat when the wedge is driven into the plug to force the plug into radial sealing engagement with said body.

6. A valve made according to claim 5, wherein said first outside manual control includes antifriction bearings between it and the body on the one hand, and between it and the second outside control member on the other hand.

7. A valve made according to claim 6, wherein said annular seat and the shoulder portion on the first control member are constituted by beveled engaging surfaces and wherein said first control member and the portion on the second control member reactive against it are formed as cooperating beveled sealing surfaces.

8. A valve made according to claim 6, wherein said annular seat and the shoulder portion on the first control member are constituted by beveled surfaces and wherein said first control member and the portion on the second control member reactive against it are formed as antifriction bearing means, and including a bellows-type sealing means connecting said sleeve with the wedge.

9. A valve made according to claim 1, wherein said hollow plug is peripherally continuous but relieved from the wedge at intervals to provide spaced deformable regions between peripheral solid sealing regions, the latter being engaged and movable by the wedge.

10. A valve made according to claim 1, wherein said hollow plug is formed of material that may be sprung and is slotted from end to end to make it peripherally discontinuous and radially deformable from a normal unsprung condition.

11. A valve made according to claim 10, wherein the form of the plug when unsprung is such that when assembled in said body it remains engaged with the inside of the cross passage as the wedge is withdrawn therefrom.

12. A valve made according to claim 10, wherein the form of the plug when unsprung is such that when assembled in said body it retracts from the inside of the cross passage as the wedge is withdrawn therefrom.

References Cited in the file of this patent

UNITED STATES PATENTS

| | | |
|---|---|---|
| 1,697,608 | Patterson | Jan. 1, 1929 |
| 1,721,324 | Wilson | July 16, 1929 |
| 2,103,536 | Inge | Dec. 28, 1937 |
| 2,488,932 | Penick | Nov. 22, 1949 |
| 2,612,340 | Laurent | Sept. 30, 1952 |
| 2,646,960 | Ericson | July 28, 1953 |
| 2,647,656 | Frisch | Aug. 4, 1953 |